United States Patent [19]

Iwamoto

[11] Patent Number: 5,061,175
[45] Date of Patent: Oct. 29, 1991

[54] CLAMPING CYLINDER SYSTEM

[75] Inventor: Norihiro Iwamoto, Zama, Japan

[73] Assignee: Toshiba Kikai Kabushiki Kaisha, Tokyo, Japan

[21] Appl. No.: 426,810

[22] Filed: Oct. 26, 1989

[30] Foreign Application Priority Data

Oct. 31, 1988 [JP] Japan ................. 63-275749

[51] Int. Cl.$^5$ ............ B29C 45/04; B29C 45/64
[52] U.S. Cl. ................. 425/589; 425/451.6; 425/451.9; 425/593
[58] Field of Search ............... 164/341; 425/589, 590, 425/451.1, 451.2, 451.9, 589, 590, 451.5, 451.6, 593

[56] References Cited

U.S. PATENT DOCUMENTS

| | | | |
|---|---|---|---|
| 2,848,771 | 8/1958 | Eggenberger | 164/341 |
| 3,156,014 | 11/1964 | Wenger | 425/589 |
| 3,373,459 | 3/1968 | Hehl | 425/451.6 |
| 3,505,708 | 4/1970 | Moslo | 164/341 |
| 3,677,685 | 7/1972 | Aoki | 425/451.2 |
| 4,249,880 | 2/1981 | Wohlrab | 425/590 |
| 4,443,179 | 4/1984 | Wohlrab | 425/590 |
| 4,565,116 | 1/1986 | Hehl | 425/590 |
| 4,846,664 | 7/1989 | Hehl | 425/589 |

FOREIGN PATENT DOCUMENTS

| | | | |
|---|---|---|---|
| 47-16578 | 7/1969 | Japan . | |
| 54-91688 | 12/1977 | Japan . | |
| 62-188601 | 5/1980 | Japan . | |
| 0051438 | 3/1982 | Japan | 425/589 |
| 0960036 | 9/1982 | U.S.S.R. | 425/590 |

Primary Examiner—Willard Hoag
Attorney, Agent, or Firm—Cushman, Darby & Cushman

[57] ABSTRACT

A clamping cylinder system used in a diecast machine and the like and includes a clamping cylinder and a booster cylinder. The booster cylinder has two chambers different in inner diameters, and a booster piston has a small diameter portion and a large diameter portion, which correspond to the inner shapes of these chambers. During the low pressure of the clamping cylinder, the oil pressure is given to the clamping cylinder, with the booster cylinder being in non-operating condition, and, when a booster operating signal is given, the booster piston is operated. With this arrangement, a boosted pressure force in accordance with the ratio of the area between the small diameter portion and the large diameter portion of the booster piston can be obtained.

16 Claims, 3 Drawing Sheets

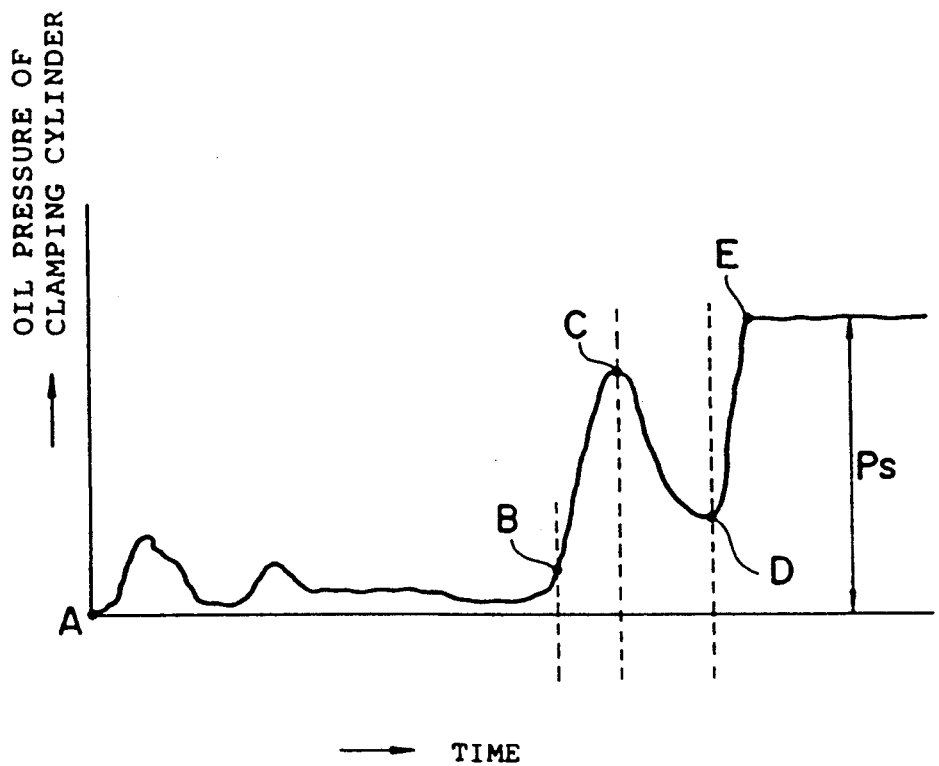

CLAMPING CYLINDER SYSTEM

BACKGROUND OF THE INVENTION

1. Field of the Invention

This invention relates to a clamping cylinder system such as a diecast machine and an injection molding machine.

2. Description of the Related Art

Heretofore, there has been known a clamping cylinder system provided with a toggle type mold clamping mechanism in order to obtain a high clamping force by a small type cylinder in a diecast machine and the like.

In the conventional system, a change in pressure in the clamping cylinder system provided with this toggle type mold clamping system has been taught as in FIG. 3 for example. This drawing is recorded by an oscillograph, and, in which an oil pressure of the clamping cylinder is given as an ordinate and a clamping time is given on an abscissa. In this drawing, from a start time A of the clamping cylinder to a time B during which a movable mold is abutted against a stationary mold, it is relatively low because of frictional resistance of a movable portion. From the abutting point B of the movable mold against the stationary mold to a point C where a link of the toggle mechanism rises, the oil pressure can increase to obtain a predetermined clamping force. From the point C to D, the clamping cylinder is operated to clamp further. However, the scale-up magnification reaches the substantially maximum at the point C, the oil pressure is decreased accordingly. A point E indicates that a piston of the clamping cylinder reaches a point of stroke end where a supply pressure Ps is constant.

As apparent from the above, in the clamping system using the toggle type mold clamping mechanism, a cylinder output, i.e. a diameter, a pressure and the like are determined on the basis of the point C.

However, an inner diameter of the clamping cylinder determined on the basis of the point C would be relatively large to obtain a predetermined cylinder output, and moreover it would be necessary to increase a discharge value of an oil pump or compensate for the discharge value by an accumulator or the like. Accordingly, in this case, a pressure loss would be high, thus presenting a problem of high installation cost.

Further, when the inner diameter of the clamping cylinder is large, because a constant amount of oil is supplied, the moving speed of the piston is relatively reduced. As a result, the clamping time is necessarily long thus presenting the problem of a decrease in production.

SUMMARY OF THE INVENTION

An object of the present invention is to provide a clamping cylinder wherein a supply oil amount to a clamping cylinder is not required to be increased as in the past, a desired clamping force can be obtained with a simplified arrangement, and a moving speed of a piston is accelerated to reduce the clamping and die opening time, so that production capability of the diecast machine and the like can be improved.

To this end, the present invention is characterized in that a clamping cylinder and a booster cylinder connected to this clamping cylinder are provided, this booster cylinder has a first and a second cylinders which are different in inner diameters, and further, has a booster piston having a small diameter portion fitted into an inner shape of the cylinder and a large diameter portion connected to the small diameter portion, upon receiving a mold closing command signal, the clamping cylinder is operated at low pressure, unless a booster operation signal is given, and, upon receiving the booster operation, the booster piston is operated to boost a supply pressure to the clamping cylinder The booster piston has a through hole penetrating through the small diameter portion and the large diameter portion in the axial direction thereof, and it is preferable that this through hole is provided therein with a check valve for normally closing the through hole. In this case, upon receiving the mold closing command signal, the check valve opens an oil supply to the clamping cylinder through the through hole unless the booster operation signal is given, and, upon receiving the booster operating signal, the check valve closes the through hole to allow the booster to operate the booster piston.

With the arrangement of the present invention, in response to the predetermined mold closing command signal or the like, the clamping cylinder system is started. In an initial condition, with the booster cylinder not operating condition, the clamping cylinder is supplied with oil, with this oil supply, the piston of the clamping cylinder proceeds, and, when the booster operating signal is given in response to a detection signal at which the movable mold connected to the piston is abutted against the stationary mold or at a position prior thereto, etc., oil pressure is supplied to the large diameter of the booster piston correspondingly. At this time, the oil supply boosted in accordance with area ratio between the large diameter portion and the small diameter portion of the booster piston is supplied to the clamping cylinder.

BRIEF DESCRIPTION OF THE DRAWINGS

FIG. 3 is a view in which changes in pressure of the conventional clamping cylinder are recorded by the oscillograph.

DETAILED DESCRIPTION OF THE PREFERRED EMBODIMENTS

The embodiments of the present invention will hereunder be described with reference to the drawings.

Figure 1:
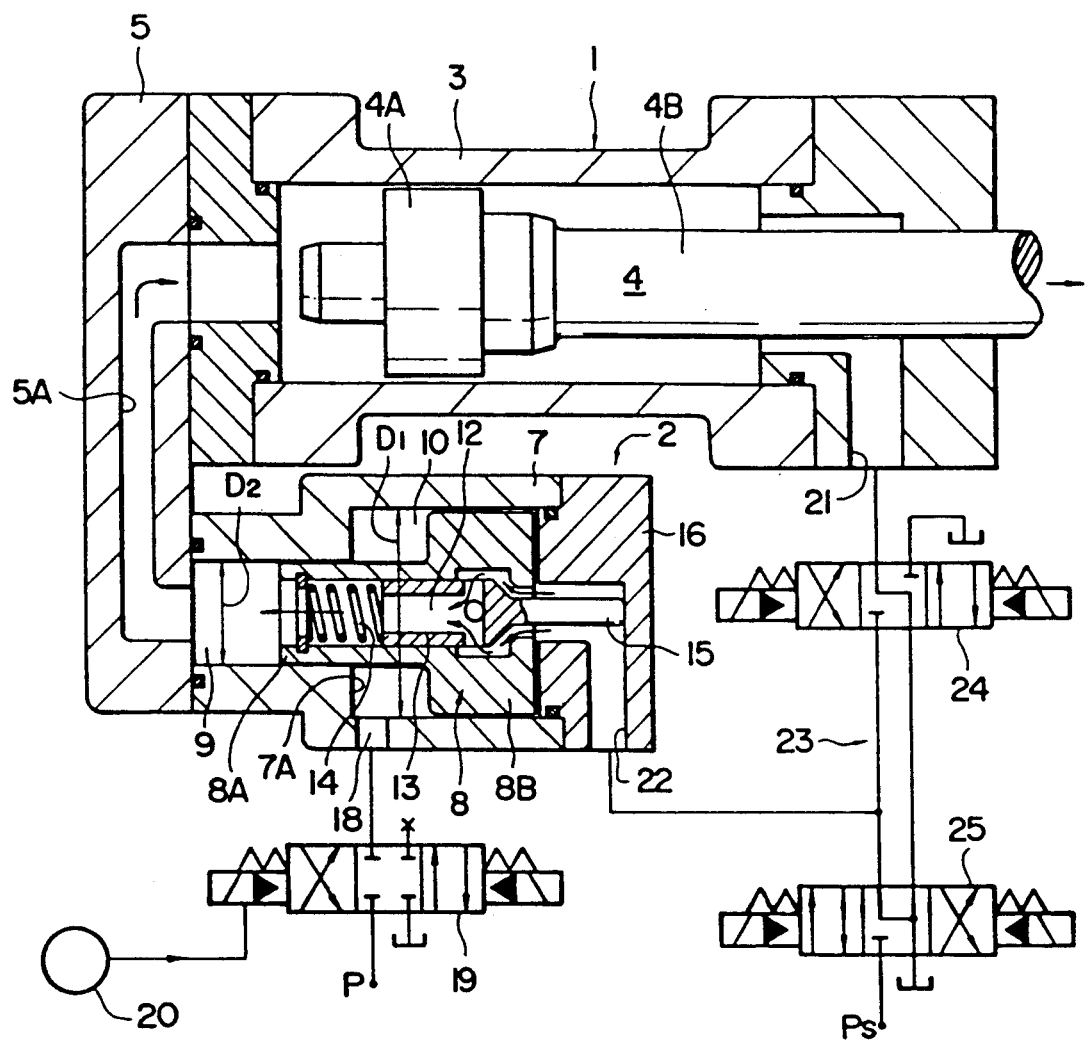
FIG. 1 is a general block diagram showing the arrangement of the clamping cylinder system of a first embodiment.

FIG. 1 shows the general arrangement of a clamping cylinder system of a first embodiment. In this drawing, the clamping cylinder system includes a clamping cylinder 1 and a booster cylinder 2 connected to the clamping cylinder 1. The clamping cylinder 1 includes a cylinder 3 and a piston 4 disposed in the cylinder 3. The right end portion of the piston 4 in the drawing is connected to a movable mold such as a diecast machine and the like through a toggle mechanism, not shown. One end of a connecting pipe 5 formed therein with a through hole 5A is connected to an end portion of the cylinder 3 in the side of a piston head 4A, and the other end of this connecting pipe 5 is connected to the booster cylinder 2.

The booster cylinder 2 includes a cylinder 7 and a booster piston 8 disposed in the cylinder 7. The cylinder 7 is formed with a stepped portion 7A and defined with a first and a second chambers 9, 10 different in diameters through this stepped portion 7A.

In this embodiment, an inner diameter D2 of the first chamber 9 is about $1/\sqrt{2}$ of an inner diameter D1 of the second chamber 10.

The booster piston 8 has a small diameter portion 8A and a large diameter portion 8B corresponding to the respective inner diameters of the fist and the second chambers 9,10, and is formed with a through hole 12 along a center axis of the small diameter portion 8A and the large diameter portion 8B. In this through hole 12, a check valve 13 is disposed so as to be movable in an axial direction thereof. This check valve 13 is engaged with a free end portion of a spring 14 at the left end in the drawing, and the check valve 13 is biased in a direction of being normally closed by an end of the large diameter portion 8B. A rod-shaped projection 15 is formed at the right end of the check valve 13 in the drawing, and, when this projection 15 is urged by an inner surface of a cylinder head 16, the check valve 13 opens the through hole 12 against the resilient force of the spring 14.

A port 18 is formed on a peripheral wall portion defining the second chamber 10 of the cylinder 7, and oil pressure supply and discharge are connected to the second chamber 10 through thus port 18. Therefore, when the oil pressure is supplied to the second chamber 10 through the port 18, the booster piston 8 is moved to the right, whereby the projection 15 is urged by the cylinder head 16 to open the through hole 12. On the other hand, when an oil pressure is discharged from the second chamber 10 through the port 18 and the booster piston 8 is moved to the left in the drawing using the operation of booster to be described hereunder, the check valve 13 closes the through hole 12 through the resilient force of the spring 14. At this time, the oil pressure supply and discharge is controlled by a solenoid valve 19, and the solenoid valve 19 is electrically connected with a relay 20 for controlling the solenoid valve 19 in response to the mold closing command signal and a detection signal just before the movable mold, not shown, is to be abutted against the stationary mold.

A port 21 provided at a side of a piston rod 4B of the clamping cylinder 1 and a port 22 provided at the cylinder head 16 of the booster cylinder 2 are connected to a hydraulic circuit 23 which controls the clamping and mold opening. This hydraulic circuit 23 is formed of a round-around circuit, and controlled by solenoid valves 24, 25.

With the arrangement as above, the clamping cylinder system in this embodiment is operated as follows.

Namely, upon receiving the predetermined mold closing command signal, the solenoid valve 19 is operated through relay 20, whereby the oil pressure is supplied to the second chamber 10 through the port 18. The oil pressure supplied to the second chamber 2 moves the booster piston 8 to the right side in the drawing, whereby the projection 15 of the check valve 13 is urged by the cylinder head 16 to open the through hole 12.

Next, the oil supplied from the port 22 of the booster cylinder 2 flows into the through hole 12 and the check valve 13 and is supplied to the piston head 4A in the clamping cylinder 1, whereby the piston 4 of the clamping cylinder 1 is forwardly moved and the movable mold, not shown, is moved toward the stationary mold.

Thereupon, the position just before the movable mold is to be abutted against the stationary mold is detected by a limit switch for example, the thus detected signal is output to the relay 20 as the booster operating signal, and the solenoid valve 19 is changed over, whereby the oil from the second chamber 10 is discharged from the port 18.

At this time, as the booster piston 8 is moved to the left in the drawing by the oil pressure supplied from the port 22, the check valve 13 is moved through the resilient force of the spring 14 to close the through hole 12, whereby the booster piston 8 is operated to perform the booster. In this case, since the ratio of area between the large diameter portion 8B and the small diameter portion 8A is 2:1, the pressure boosted as much as twice is applied to the side of the piston head 4A of the clamping cylinder 1. Accordingly, even if the inner diameter of the clamping cylinder 1 would be $1/\sqrt{2}$, the oil pressure would be doubled, the equivalent clamping force should be obtained.

When the booster cylinder 2 is boosted with the predetermined clamping force being maintained, the work is completed and the signal for separating the molds is output, the oil pressure is supplied from the port 18 of the booster cylinder 2 to return the booster piston 8, whereby the projection 15 of the check valve 13 is urged by the cylinder head 16 to open the through hole 12. In this condition, the oil pressure from the port 21 of the clamping cylinder 1 into the cylinder 3 retracts the piston 4, whereby the movable mold is separated from the stationary mold.

With the arrangement of this embodiment, the booster piston 8 is constituted by the small diameter portion 8A and the large diameter portion 8B, the through hole 12 is made openable by the check valve 13 and the through hole 12 is closed by the check valve 13 to operate the booster piston 8. Therefore, even if the oil amount fed to the clamping cylinder 1 would not be large, the booster force in accordance with the area ratio as described above would be obtained, and, even if the clamping cylinder would not be of the large diameter, the predetermined clamping force can be obtained. This means that, even if the inner diameter of the cylinder 3 would be $1/\sqrt{2}$ in the conventional system, the equivalent clamping force can be obtained, thus increasing the moving speed of the piston 4 of the clamping cylinder 1.

Further, such a problem that the pressure loss of the discharge amount of the feed pump is made at the high pressure in order to obtain the large clamping force can be avoided completely.

In the experimental example adopting the system of this embodiment, the clamping time is 6.8 sec. the mold opening time was 6.7 sec. the clamping time in the conventional system having the equivalent clamping capacity was 10 sec. and the equivalent mold opening time was 11 sec. As described above, in this embodiment, the totally required time of the clamping and mold opening time is shortened by 7.5 sec. as compared with the conventional system and it is understood that there is the considerable improvement in the production capability in this respect.

Figure 2:
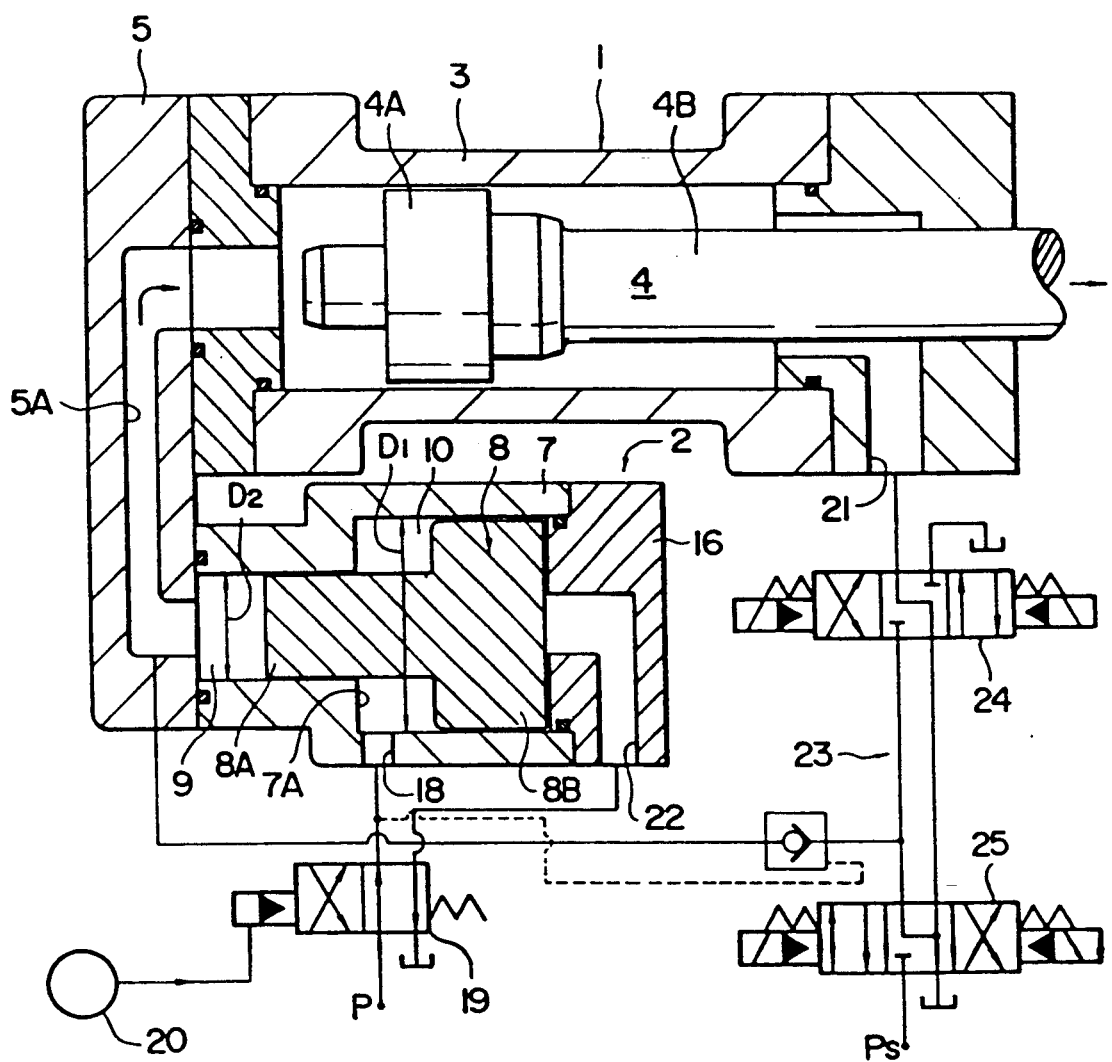
FIG. 2 is a general block diagram showing the arrangement of the clamping cylinder system of a second embodiment.

FIG. 2 shows the second embodiment of the present invention. This second embodiment differs from the first embodiment in that the booster piston 8 is formed of a solid construction, the oil pressure by which the clamping cylinder 1 is operated at low pressure in the first place is given to the through hole 5A of the connecting pipe 5 through the hydraulic circuit 23, and, when the booster operating signal is given, the solenoid valve 19 is changed over to perform the oil supply to the port 22 of the booster cylinder 2.

In this second embodiment, in the advantage of the first embodiment, such an advantage can be added that the construction of the booster piston can be simplied only if the hydraulic circuit is slightly changed.

Incidentally, in the above embodiment, the aforesaid ratio of area of the booster piston 8 should not be fixed and would be set in accordance with an expected booster pressure. With this arrangement, it would be possible to provide wide clamping cylinder systems suitable for various clamping capacities.

As the means for detecting the position just before the movable mold is to be abutted against the stationary mold, the limit switch is to output the thus detected detection signal to the relay 20. However, a means for detecting a pressure on the side of the piston head of the clamping cylinder 1 would be provided and the booster cylinder 2 would operate in response to a change in pressure detected by the means.

Further, the connecting construction between the clamping cylinder 1 and the booster cylinder 2 is not limited to the example of the illustrated construction and a tandem type in which the both constructions are aligned with each other may be adopted.

In this invention, in the case where an unusual pressure change would be detected where a foreign material is included in the mold portion, etc., such a construction that an operation of the booster cylinder 2 would be avoided previously. In this case, a preset standard pressure value as being regarded as an unusual pressure should be able to be set relatively low, thus detecting even a slight foreign inclusion with high accuracy.

Further, in the foregoing description, the system according to the present invention has been adopted to the diecast machine. However, it goes without saying that the system according to the invention can be applied to the clamping cylinder of the injection molding machine.

As has been described hereinabove, the present invention has the advantages that there is no need of increasing the supply oil amount to the clamping cylinder as compared with the past, the desired clamping force can be obtained with the simplified construction, and the moving speed is accelerated to shorten the clamping and mold opening time, thus providing the clamping cylinder system capable of improving the production capability in the diecast machine and the like.

What is claimed is:

1. A mold clamping cylinder system having a clamping cylinder and a booster cylinder connected to the clamping cylinder, the booster cylinder has a first and a second cylinder which are different in inner diameters, and further, has a single booster piston having a small diameter portion fitted into an inner shape of the cylinder and a large diameter portion connected to the small diameter portion, upon receiving a mold closing command signal, the clamping cylinder is operable at a low pressure unless a booster operation signal is given, and, upon receiving the booster signal, the booster piston is operable to boost a supply pressure to the clamping cylinder, said booster piston having a through hole penetrating through the small diameter portion and the large diameter portion in the axial direction thereof, the through hole having a check valve spring biased for normally closing the through hole, upon receiving the mold closing command signal, the check valve opening the through hole to give the oil supply pressure to the clamping cylinder through the through hole unless the booster operating signal is given, and, upon receiving the booster operating signal, the check valve closes the through hole to operate the booster piston.

2. A clamping cylinder system as set forth in claim 1, wherein said check valve closes the through hole through the resilient force of a spring, and, has a projection extending to the outside from the through hole, whereby said projection is urged by a cylinder head of a booster cylinder to open the through hole.

3. A clamping cylinder system as set forth in claim 1, wherein the clamping cylinder and the booster cylinder are each configured and operatively coupled so that, upon receiving the mold closing command signal, the oil supply is connected between the clamping cylinder and the small diameter portion of the booster piston with the booster cylinder being maintained in non-operating condition unless the booster operating signal is given, and, when the booster operation signal is given, the oil supply is connected to the large diameter portion of the booster piston to operate the booster cylinder.

4. A clamping cylinder system as set forth in claim 1, wherein the ratio of the area between the large diameter portion and the small diameter portion is made variable.

5. A clamping cylinder system as set forth in claim 1, wherein the ratio of the area between the large diameter portion to the small diameter portion of the booster piston is 2:1.

6. A clamping cylinder system as set forth in claim 1, wherein the clamping and the booster cylinder are each configured and operatively coupled so that a change in pressure at the low pressure operation of the clamping cylinder detects an exceeding of a preset pressure valve to thereby stop the oily supply for operating the booster cylinder.

7. A clamping cylinder system as set forth in claim 1, wherein said clamping cylinder system is connected to a movable mold of a diecast machine.

8. A clamping cylinder system as set forth in claim 1, wherein said clamping cylinder system is connected to a movable mold of an injection molding machine.

9. In a clamping cylinder system which employs a toggle mechanism consisting of a linkage, the improvement comprising:
a clamping cylinder;
a booster cylinder consisting of a cylinder having first and second chambers which are different in internal diameter and a single booster piston having a small diameter portion and a large diameter portion to reciprocally move within the first and second chambers upon receiving a mold closing command signal and a later booster operation signal, so that the clamping cylinder is operable in a low pressure upon receiving the mold clamping command and subsequently operable to boost a supply pressure to the clamping cylinder when receiving the booster operation signal, said booster piston having a through hole penetrating through the small diameter portion and the large diameter portion in the axial direction thereof, the through hole having a check valve spring biased for normally closing the through hole, upon receiving the mold closing command signal, the check valve opens the through hole to give the oil supply pressure to the clamping cylinder through the through hole unless the booster operating signal is given, and, upon receiving the booster operating signal, the check valve closes the through hole to operate the booster piston.

10. A clamping cylinder system as set forth in claim 9, wherein said check valve closes the through hole through the resilient force of a spring, and, has a projection extending to the outside from the through hole, whereby said projection is urged by a cylinder head of the booster cylinder to open the through hole.

11. A clamping cylinder system as set forth in claim 9, wherein the clamping cylinder and the booster cylinder are each configured and operatively coupled so that, upon receiving the mold closing command signal, the oil supply is connected between the clamping cylinder and the small diameter portion of the booster piston with the booster cylinder being maintained in non-operating condition unless the booster operating signal is given, and, when the booster operation signal is given, the oil supply is connected to the large diameter portion of the booster piston to operate the booster cylinder.

12. A clamping cylinder system as set forth in claim 9, wherein the ratio of the area between the large diameter portion and the small diameter portion is made variable.

13. A clamping cylinder system as set forth in claim 9, wherein the ratio of the area between the large diameter portion to the small diameter portion of the booster piston is 2:1.

14. A clamping cylinder system as set forth in claim 9, wherein the clamping cylinder and the booster cylinder are each configured and operatively coupled so that a change in pressure at the low pressure operation of the clamping cylinder detects an exceeding of a preset pressure value to thereby stop the oil supply for operating the booster cylinder.

15. A clamping cylinder system as set forth in claim 9, wherein said clamping cylinder system is connected to a movable mold of a diecast machine.

16. A clamping cylinder system as set forth in claim 9, wherein said clamping cylinder system is connected to a movable mold of an injection molding machine.

* * * * *